G. W. BENTON.
MACHINE FOR FORMING SHOVEL BLADES AND SPREADING TANGS.
APPLICATION FILED DEC. 17, 1917.
1,262,624.
Patented Apr. 16, 1918.
3 SHEETS—SHEET 1.
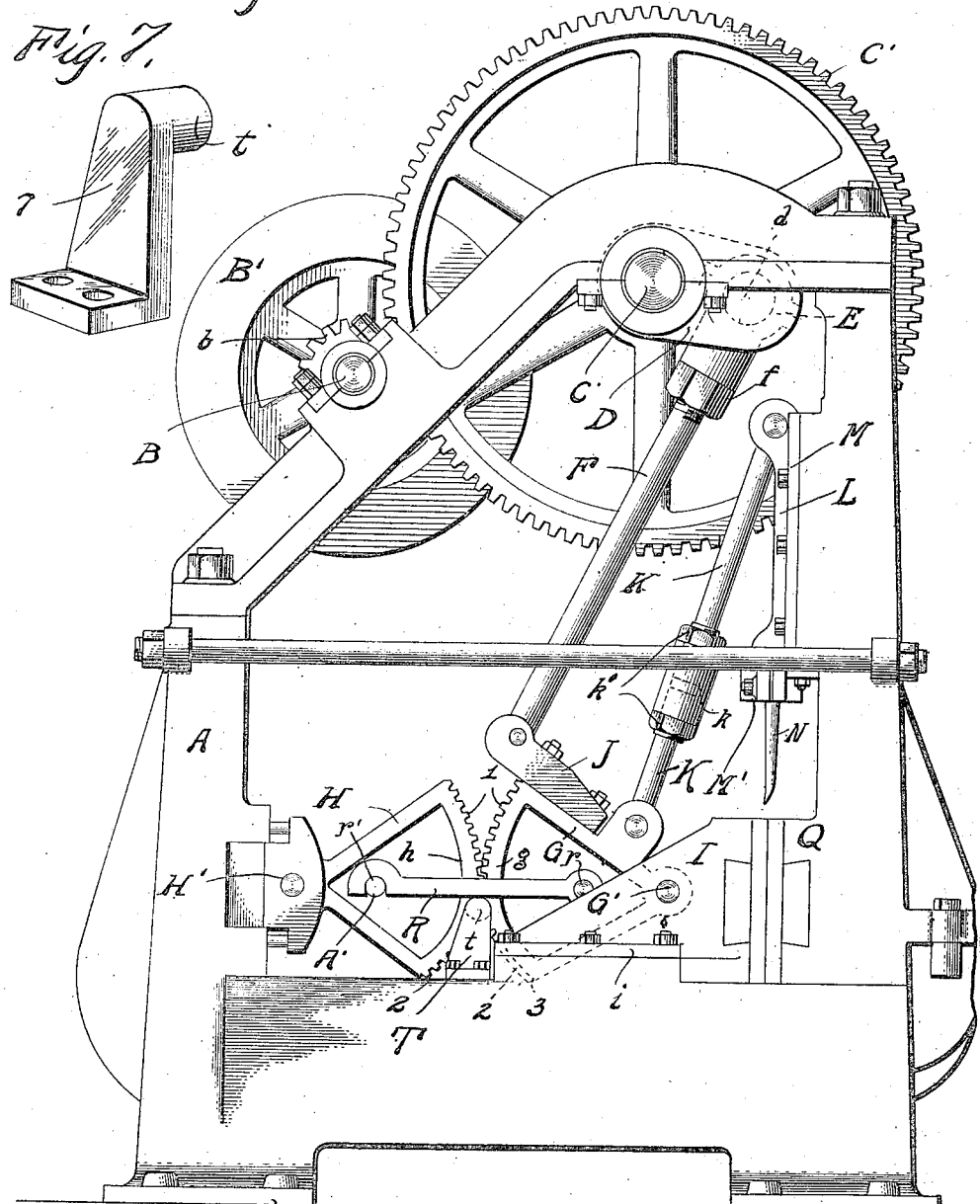
Witnesses
George W. Benton

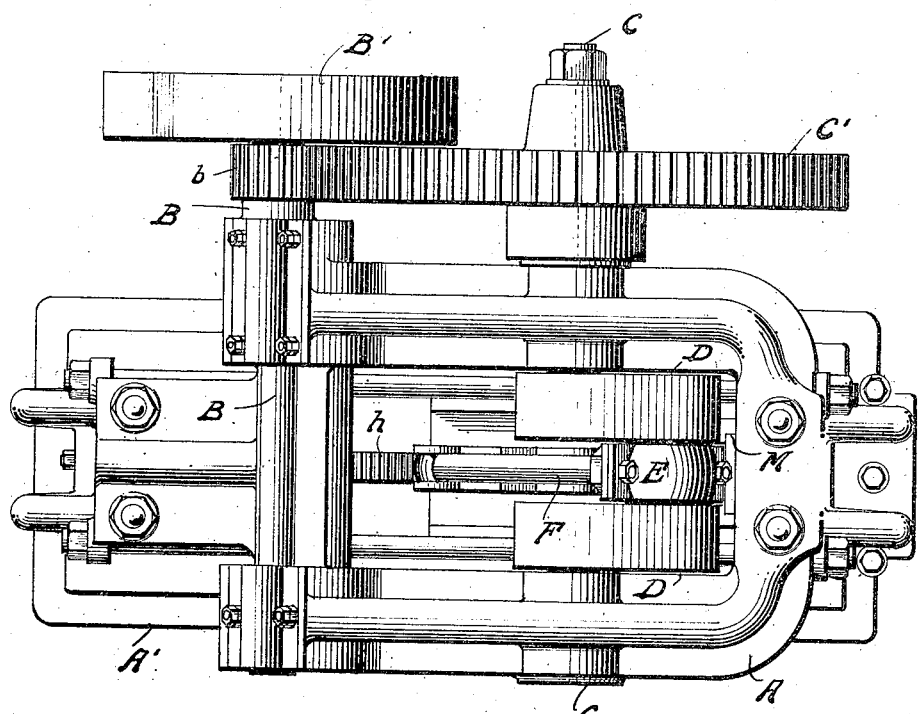
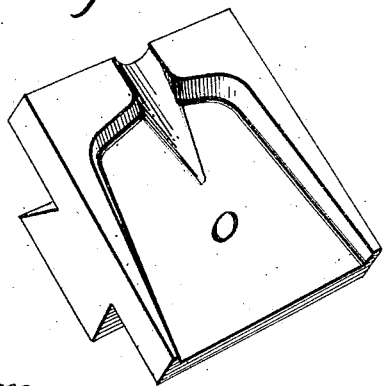
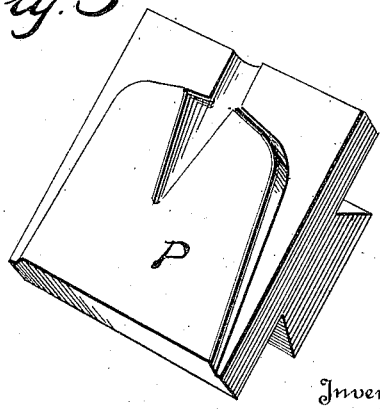

G. W. BENTON.
MACHINE FOR FORMING SHOVEL BLADES AND SPREADING TANGS.
APPLICATION FILED DEC. 17, 1917.
1,262,624.
Patented Apr. 16, 1918.
3 SHEETS—SHEET 3.
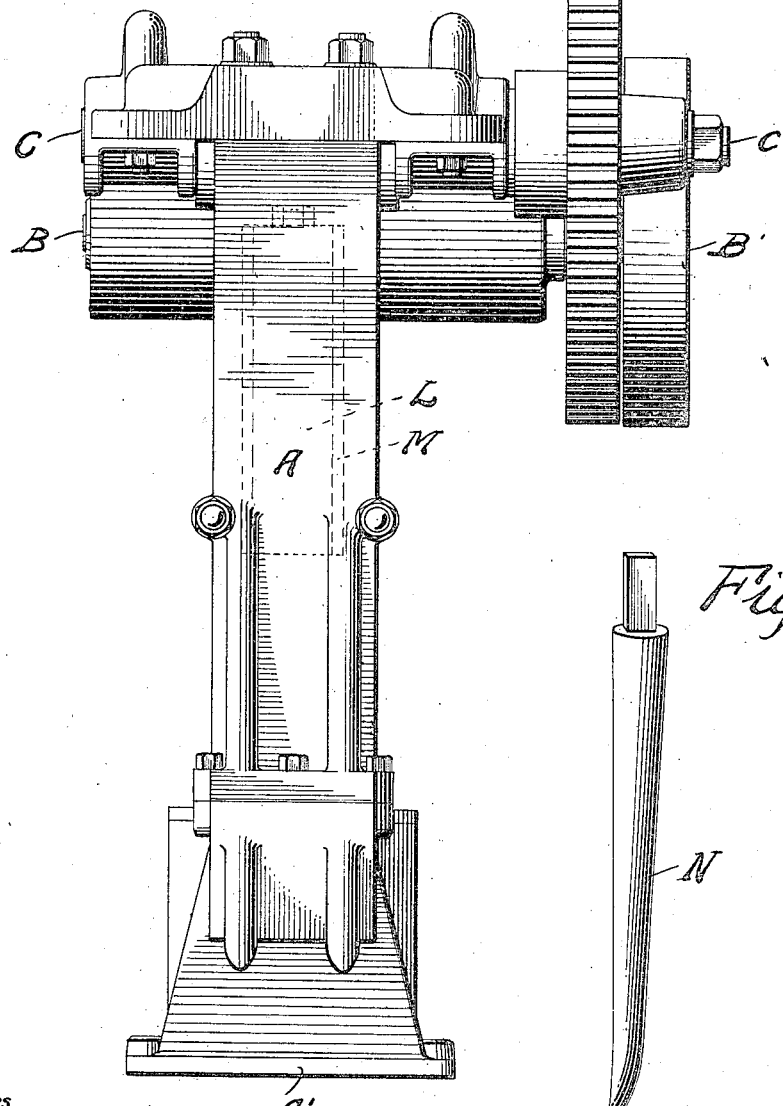
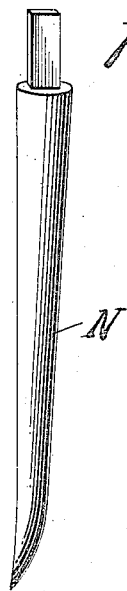
Witnesses
Inventor
George W. Benton
By
W. H. Babcock
Attorneys

UNITED STATES PATENT OFFICE.

GEORGE W. BENTON, OF CONNEAUT, OHIO.

MACHINE FOR FORMING SHOVEL-BLADES AND SPREADING-TANGS.

1,262,624.  Specification of Letters Patent.  Patented Apr. 16, 1918.

Application filed December 17, 1917. Serial No. 207,474.

*To all whom it may concern:*

Be it known that I, GEORGE W. BENTON, a citizen of the United States, residing at Conneaut, in the county of Conneaut and State of Ohio, have invented certain new and useful Improvements in Machine for Forming Shovel-Blades and Spreading-Tangs, of which the following is a specification.

This invention relates to machinery for forming shovel blades and like articles and spreading the tangs of the same into proper position for attachment to the handle.

In the manufacture of solid back shovels it has been the practice to form the shovel blade by a drop hammer or some other mechanism, which would allow the upper die to remain on top of the shovel blade and to thrust a mandrel by hand endwise in between the tangs, while so held, for spreading them. The object of the present invention is to provide means for mechanically performing both operations by the automatic action of the same mechanism, thus simplifying the work, lessening the need for handling and reducing the number of hands employed and the expense of the operation. To this end I make use of a press which forms the shovel blade between dies and then holds it tightly while a mandrel, driven by the same wheel and connections, comes down between the two tangs of said blade, opening or spreading them to receive the handle.

In this way the manufacturer can turn out with two workmen as much work as could be turned out by four workmen in the usual way. Also, the shovels produced will be more uniform, as the mandrel will be set to come down to the same point every time, which it cannot be made to do by hand with certainty; consequently the tangs of each shovel will be opened just so far. Futhermore, the mandrel, being weighted by the heavy reciprocating sash or slide which carries it, will be thrust in more efficiently than by manual action, and the press, being operated by cams, will hold the dies securely and accurately for a predetermined period, preferably while the cams are doing about two thirds of their oscillating travel.

To these ends and for these and other advantages, this invention consists in the construction and combination of parts hereinafter more particularly set forth and claimed.

Of course the invention is not restricted to any particular form, material or kind of shovel, spade, scoop or the like, but may be used in making any device of the kind in which both blade-forming and tang-spreading may be needed.

In the accompanying drawings:

Figure 1 represents a side elevation of a machine embodying my invention;

Fig. 2, a plan view of the same;

Fig. 3, an end elevation of the same;

Fig. 4, a detail view of one form of die which may be used therein;

Fig. 5, a detail view of the complementary die;

Fig. 6, an enlarged detail view of one form of mandrel which may be used in said machine; and Fig. 7, a detail view of the hook-freeing device.

Of course the dies and mandrel will differ in form according to the particular work to be done.

In said drawings, A designates the frame of the machine having a base A'. It is unnecessary to describe the details of this frame, as they are of ordinary character and not involved in the invention. Any frame of proper compactness and solidity and affording the necessary bearings, attachments and guideways hereinafter described will suffice.

B designates a driving shaft journaled in bearings on said frame and provided with a power receiving belt pulley B', also a pinion *b*. This pinion meshes with and drives a large gear wheel C', mounted on and turning with the main shaft C for actuating the shovel-blade-forming and tang-spreading devices, the said shaft C being journaled in bearings of said frame. A pair of arms D of this shaft carry a wrist pin *d*, which is connected by a detachable eye or yoke E to the upper end of a pitman F, having a nut *f* on its screw-threads below the engagement of said pitman with the tubular stem of said connecting eye.

The lower end of said pitman is pivotally connected to an operating rocking cam G, which is provided with a segmental gear rack *g* of cog-teeth, engaging a similar rack *h* of a companion cam H. By the combined action of these two cams G and H, the movable die is operated; cam H being pivoted to a fixed point H' and cam G being pivoted at G' to a sliding die holder I, guided in ways $i$ of the base of the machine. The connection between said pitman and cam G is preferably not direct, but by means of a bracket J clamped to said cam and extending beyond the corner of said cam nearly in the direction of the other cam to give greater leverage at the point of attachment of the pitman.

From said cam G, at a point much nearer its pivot than is said point of attachment of the pitman, a connecting rod K extends to the upper end of a heavy vertically moving sash or slide L, to which it is pivotally connected, said slide reciprocating in vertical guides M fixed to the frame A. The lower end of said slide carries a clamping socket M', which is a tool-holder for a mandrel N of any proper form or size, said mandrel being used as a reciprocating plunger to spread the tangs of a shovel-blade. As shown in Figs. 1 and 6, this mandrel has its point beveled chiefly on one side; but as before stated, its form may be varied as needed or at will. The said connecting rod is adjustable as to length within reasonable limits, preferably as shown, by making it in two sections, which are coupled at their proximate ends by screw-threaded engagement with a coupling sleeve $k$, at the ends of which they are provided with tightening or locking nuts $k'$.

The dies O and P, Figs. 5 and 6, or those of any other required form, are set respectively into the said movable die holder I and into a fixed die holder Q, preferably integral, as shown, with the frame of the machine. The operation of the cams and mechanism operated thereby is to force the movable die toward the fixed die, compressing and shaping a shovel-blade blank between them and holding it firmly during a considerable part, preferably about two thirds, of the oscillating travel of said cams about their pivots. During this holding, the mandrel is pulled down by the action of cam G, opening the shovel-blade tangs with its point. The continued rotation of the main-shaft causes the said pitman to reverse the action of the cams, withdrawing the mandrel and opening the dies for the removal of the formed and opened shovel-blade and the introduction of a new blank. The operation of pressing, holding and spreading is then repeated and thus the machine continues indefinitely a continuous series of such cycles of automatic operations, requiring no manual insertion of the mandrel nor any handling except feeding the blanks, withdrawing the formed shovel blades and keeping the machine running.

A coupling hook R is pivoted on a lateral pivot pin $r$ of cam G and drops over a similar pin $r'$ of cam H to provide for the withdrawal of the movable die and its die holder in opening the dies as above. A fixed pin $t$, extending horizontally from a standard T, raised on the base A' of the machine, disengages this hook from $r'$ when the downward movement of the cams from the position shown in Fig. 1 threatens to cause this connection of the two cams to bind them.

The upper parts 1 of the rack of these cams from their upper ends for about two thirds of their length follow corresponding circular curves, having the pivots of said cams for centers; and consequently while these parts of the cams are in engagement there is no action on the movable die beyond holding it securely. The cam action of said cams is confined, as herein illustrated, to the lower parts 2 of the rack faces from the ends of parts 1 to the lower ends of said racks, these operative rack faces 2 sloping away from each other correspondingly so that each cog-tooth of each rack is nearer the point of pivot of its cam than the tooth above it. Thus when the cams turn upward from the lowest point to the position shown in Fig. 1, the die faces still hold the shovel blade. Continued movement in the same direction brings the cogs of part 2 of the cams into mesh and gradually withdraws the movable die, the hook R coupling the two cams together for this purpose. Movement in the reverse direction brings the parts 1 of the cams again into mesh and the movable die is moved to compressing position and held there during the downward and upward movement of said cams until said parts 2 of the cams again come into mesh. While the parts 1 are in mesh there is no action of the cams on the dies, but only the action of cam G and attachments on the mandrel, and this is true both when the cams turn downward and when they turn upward; but when they turn downward the hook R is automatically lifted by pin $t$ so that there may be no strain or binding due to the changing position of the pins $r$ and $r'$ with relation to the pivots of the cams.

Of course the various parts are calculated in shape, distance and arrangement to produce the desired movements and results and these may obviously be varied with proper relation to each other. It is necessary to show some one operative construction and combination of cams, racks and coöperative devices, but the particular form shown is intended as an instance only, not as an absolute restriction. Any combination of such mechanism and any form of cams will suffice which will press, shape and hold the shovel blade while the mandrel is forced in to spread the tangs by the same automatic operation. Nevertheless, I prefer the construction, combination and arrangement illustrated and described.

Having thus described my invention, what I claim as new and desire to secure by Letters Patent is:

1. Mechanism for closing a pair of dies to press and form a shovel blade or like article, in combination with means operated by said mechanism for moving a mandrel to spread a pair of tangs of the blade thus pressed.

2. Mechanism for closing a pair of dies to press and form a shovel blade or like article, said mechanism being adapted to hold firmly the said blade for a time after such pressure, in combination with automatic means for moving a mandrel to spread a pair of tangs of the blade thus pressed and while thus held.

3. A shovel-blade forming press, in combination with a shaft for actuating the same, means for carrying a tang-spreading mandrel across the path of movement of said press, and connections whereby said shaft automatically actuates said press and said mandrel carrying means, in order that the shovel forming and tang spreading may be performed by one mechanical operation.

4. In combination with a shaft, a pitman driven thereby, a rocking cam provided with a curved rack and actuated by said pitman, a second cam provided with a similar rack and meshing with the rack first mentioned, a movable die holder to which one of said cams is pivoted, a fixed die holder coöperating therewith, a mandrel-carrying slide arranged to cause its mandrel to move endwise and spread the tangs of a shovel blade pressed and held by said dies, and a connecting rod from one of said cams to said slide for reciprocating the latter.

5. In combination with a shaft, a pitman driven thereby, a rocking cam provided with a curved rack and actuated by said pitman, a second cam provided with a similar rack and meshing with the rack aforesaid, a fixed die, a movable die-holder coöperating therewith and having one of said cams pivoted thereto, these cams being shaped to hold said movable die in one position for a time after the shaping pressure is complete, a mandrel-carrying slide arranged to cause its mandrel to spread the tangs of a shovel or other blade thus held by said dies, and means connecting one of said cams to said slide for reciprocating the latter.

6. In combination with a shaft, a pitman driven thereby, a rocking cam provided with a curved rack and actuated by said pitman, a second cam provided with a similar rack and meshing with the rack aforesaid, a fixed die-holder and die, a movable die holder having the first mentioned cam pivoted thereto, a die carried by this latter die-holder, a mandrel arranged to open the tangs of a shovel blade held by said dies, and a reciprocating slide carrying said mandrel, and a connecting rod from said pitman-connected cam to said slide, the said devices being arranged to shape the said blade and hold it securely while the mandrel is automatically actuated by said cam to effect such spreading.

7. In combination with a pair of cams geared together and a pair of die-holders actuated thereby for pressing a shovel blade or the like, means for rocking said cams, a mandrel, and means actuated by one of said cams for moving said mandrel endwise to spread the tangs of a shovel blade.

8. In combination with a pair of cams geared together and a pair of die-holders, one of which is reciprocated thereby for opening and closing, and has one of said cams pivoted thereon, means for actuating said cams, a mandrel for spreading the shovel tangs by endwise motion, means carrying said mandrel and reciprocated by one of said cams, a detachable connection between the two cams to hold them together in withdrawing the movable die-holder, and means for automatically freeing such connection at a predetermined point of the rocking movement of said cams.

9. In combination with a pair of cams geared together, means for driving them, a reciprocating mandrel-carrying slide actuated by one of said cams, a fixed die-holder, a movable die-holder having the last mentioned cam pivoted thereon, a hook pivoted on one of said cams, a pin on the other cam over which said hook drops, and a fixed device arranged to lift said hook from this pin when the said cams turn to a certain position, the said devices being constructed to shape the shovel blade and hold it firmly thereafter while the mandrel automatically spreads the tangs of said blade.

In testimony whereof, I have signed my name to this specification in the presence of two subscribing witnesses.

GEORGE W. BENTON.

Witnesses:
H. G. KINGDOM,
MAY CHAPMAN.

Copies of this patent may be obtained for five cents each, by addressing the "Commissioner of Patents, Washington, D. C."